United States Patent
Guberman et al.

(10) Patent No.: US 11,902,117 B1
(45) Date of Patent: Feb. 13, 2024

(54) VIRTUAL ON-WATCH

(71) Applicant: Bank of America Corporation, Charlotte, NC (US)

(72) Inventors: Arthur Guberman, Freehold, NJ (US); Yog Hari, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/989,808

(22) Filed: Nov. 18, 2022

(51) Int. Cl.
  *G06F 15/16* (2006.01)
  *H04L 43/02* (2022.01)
  *G06F 9/54* (2006.01)

(52) U.S. Cl.
  CPC .............. *H04L 43/02* (2013.01); *G06F 9/547* (2013.01)

(58) Field of Classification Search
  CPC ................................. H04L 43/02; G06F 9/547
  See application file for complete search history.

(56) References Cited

U.S. PATENT DOCUMENTS

2020/0192743 A1*  6/2020  Harper ................ G06F 11/0793
2022/0066856 A1*  3/2022  Agarwal ................ H04L 51/23

* cited by examiner

*Primary Examiner* — Normin Abedin
(74) *Attorney, Agent, or Firm* — Weiss & Arons LLP (57) ABSTRACT

A system for providing a virtual on-watch—i.e., a comprehensive and actionable review of IT triage resources. The system includes a receiver for receiving a report of a service outage incident in a computer network, an auto-generated electronic bridge that electronic stages a response to the service outage incident, and a transmitter for transmitting, in real-time, an Application Programming Interface (API) call to a WebEx bridge platform for all bridge information available in the computer network. The bridge information includes the electronic bridges that are currently being hosted by the WebEx bridge platform. The system also includes information about responders currently involved in the plurality of electronic bridges. The system identifies responders that are qualified and that are electronically listed on the WebEx bridge as available to join electronic bridge. The WebEx bridge platform may send an electronic prompt to the at least one of the set of responders.

12 Claims, 10 Drawing Sheets

Incident Number: TB00000000000005 | AIT Number: 47021

▲ Bridge Details — 512

| | | | | | | |
|---|---|---|---|---|---|---|
| Heightened Awareness: | Yes | Call leader: | Jane Doe | Caused by Change: | No | Data Event: |
| Priority: | NA | Call Facilitator: | John Smith | In recess: | Yes | CC Engaged: |
| Impact: | NA | Region: | Americas | Event Start: | | CC Triage: |
| Urgency: | NA | Domain: | | Reservation call type: | Incident | CC Comm: |

| | |
|---|---|
| Bridge Line: | 1.888.XXX.7575(TF) + 1.123.456.7891(BAK) 28809550# |
| Network Triage Room: | TRI | Linked Ticket ID: | NA |
| Workroom: | Not Available Try Again | Impacted AIT: | 47021 |
| | | Impact Status: | Active |
| Brief Description: | Test with Main URL incident 123 |
| Customer Experience: | Customer impact currently being confirmed by operations/support teams |
| Status Update: | Engaging production support and operations teams for triage and investigation |

▲ On-Call Information — 514

AIT  Servers  Middleware  Database  Resource Search

| Group Name | | Please select a group to see the On-call personnel |
|---|---|---|
| MTCTO DEV GLBL | | |
| APM_SITSCOPE | | |
| MIDDLEWARE-CUSTOMER DEPOSIT & TRANSACTION SYSTEMS | | |
| MYCTO SUPPORT | | |
| ARDB SUPPORT | | |

▲ AIT Information — 516

| App Manager: | Bill Jones |
|---|---|
| Management Contact: | Joe Brown |
| Tech Executive: | Mary Smith |
| App DG: | Ann Davis |

▲ Summary Information — 518

| App Servers: | 4 |
|---|---|
| App Server Instances: | 44 |
| Data Centers: | 5 |
| Database Servers: | 8 |
| Databases/Instances/Schemas: | 8 |
| Hosts: | 19 |
| Web Servers: | 4 |
| Web Server instances: | 4 |

▲ Backup & Recovery — 520

| Recovery time Objective: | Tier 3/up to 1 hour |
|---|---|
| Recovery Point Objective: | Tier 3/recent synchronization Point<30 min |
| Overall Recovery Strategy: | Active-Active-Passive |
| Data Recovery Strategy: | Continuos synchronization replication |
| RPO Recovery Test | |
| RPO Restore test date: | Apr 28 2023 00:00 AM |

500

Infrastructure

| Servers | | Middleware | Database |
|---|---|---|---|

522

| Hostname | Model | OS | Location |
|---|---|---|---|
| LTX10BECT0AS00V | VMware Virtual Platform | OS RHEL 7 | TX8-045-01-02 |
| LTX10BECT0AS01 | PROLIANT DL380 GEN9 | OS RHEL 7 | TX8-045-01-01 |
| LTX10BECT0AS01V | VMware Virtual Platform | OS RHEL 7 | TX8-045-01-02 |
| LTX10BECT0AS02 | PROLIANT DL380 GEN 9 | OS RHEL 7 | TX8-045-01-01 |
| LTX10BECT0MQ01V | VMware Virtual Platform | OS RHEL 7 | TX8-045-01-02 |
| LTX10BECT0MQ02V | VMware Virtual Platform | OS RHEL 7 | TX8-045-01-02 |
| LTX10BECT0MQ03V | VMware Virtual Platform | OS RHEL 7 | TX8-045-01-02 |

▲ All Active Bridges For All AITs

| Incident # | Description |
|---|---|
| INC000039776629 | eComm Content Management System |
| INC000039961937 | Enumeration issue for a few users with |
| INC000040003847 | Electric Commerce System - MWO PROD |

524

▲ All Active Bridges For All AITs

| Severity | Ticket # | Last | Description |
|---|---|---|---|
| P3/Low | INC000039998033 | 6/27/22 8:18AM | Critical Production |
| P3/Low | INC000039974774 | 6/26/22 1:33PM | Bounce Service on |
| P3/Low | INC000039985063 | 6/25/22 9:46PM | Critical Production |
| P3/Low | INC000039970476 | 6/25/22 1:46PM | Minor Production |

526

▲ Up Stream/Down Stream for AIT 4702

| Data Flow | AIT Name | Incident # |
|---|---|---|
| | No UpStream/Down Stream Data Found | |

528

▲ Last Five Changes for AIT 41021

| CRQ | Date | Description |
|---|---|---|
| CRQ000012518541 | 6/19/22 10:00PM | EPAS - OS Patching... |
| CRQ000012518388 | 6/20/22 12:00AM | EPAS - OS Patching... |
| CRQ000012518536 | 6/18/22 11:00PM | EPAS - OS Patching... |
| CRQ000012517681 | 6/27/22 8:00 AM | AIT-72472 Sitescope... |

Command Center Incident Management Platform 1.0

Home>Monitor>Application Production Services>Virtual on Watch

Incident Number: INC000041519054 | AIT Number 60306

▲ Bridge Details

| Heightened Awareness: | No | Call leader: | Jane Doe | Caused by Change: | No | Data Event: | No |
|---|---|---|---|---|---|---|---|
| Priority: | 3-Low | Call Facilitator: | John Smith | In recess: | No | CC Engaged: | Yes |
| Impact: | 3-Low | Region | EMEA | Event Start: | 2022-09-19 6:53AM | CC Triage: | No |
| Urgency: | 3-Low | Domain | GBAM(Banking) | Reservation call type | Incident | ICC Comm: | No |

| Bridge Line: | 866-XXX-5167...7244515 🔗 | | |
|---|---|---|---|
| Network Triage Room: | | Linked TicketID: | NA |
| Workroom(Mattermost): | INC000041519054 | Impacted AIT: | 60806 |
| Bridge Link: | https://goto_bridge_com.454b65cd | Impact Status: | Active |

| Brief Description: | Virtual Account Management PRD transaction report issue |
|---|---|
| Customer Experience: | No payment impact. Client side reconciliation issue due to incorrect PDR report |
| Status Update: | As of 10:57 on 9/19/2022 Opened recess for 09.19@11:00am/Vam to identify and review all impacted accounts. Duplicate transaction issue for 16Sept PDR: Once duplicate entries are in all accounts, reversal entries will be posted to sync virtual balance. PDR report for 20Sept will show correct balance amount. |

Production View | Executive View | Clear

VIRTUAL ON-WATCH

FIELD OF TECHNOLOGY

Aspects of the disclosure relate to monitoring and mitigating Information Technology (IT) incidents. Specifically, the disclosure relates to monitoring and mitigating IT incidents that cause a loss of service.

BACKGROUND OF THE DISCLOSURE

The following true-to-life experiences illustrate the motivation for formulation of efficient response strategies and systems to IT incidents. In the cases that follow, a response team formed and joined an electronic bridge—i.e., a formal electronic construct for use in response to the incident pursuant to the triage efforts. Thereafter, human and machine resources were identified to triage the IT incidents.

In a first use case, relevant—i.e., knowledgeable—database administrators (DBAs) were paged.

One response team waited for 15 minutes, as per protocol, just to find out that the database administrator (DBA) assigned to responding to such calls, was currently working on another incident. A second page went out to the secondary on-call DBA and again that DBA was already engaged on another problem/issue, so another 15 minutes was lost. Finally, the responding group reached out to the manager of the relevant DBAs and they identified yet another DBA, and the manager also had to join the call. The result was that the responding group lost between 30 to 45 minutes trying to figure out what DBA are available to join the bridge and help resolve a problem, unnecessary delaying service restoral following the incident.

Another use case that provides a motivation for the current embodiments follows. An incident occurred, and a response team joined the bridge. The response team initiated a search for an appropriate team/individual to page to assign to the incident. However, since identification information for the team/individual is frequently not documented, or not real-time reflective, and can be relegated to unwritten knowledge within the support team, an incorrect resource was paged. At that point, the response group waited 15 minutes only to find out that it had paged a wrong resource. Then, the group resumed the search for the correct responder, further unnecessary delaying service restoral.

It would be desirable to provide, in response to use cases such as the foregoing, embodiments that consolidate application support hierarchy mapping (server, database, middleware) support groups and individuals that comprise these groups, application dependencies like upstream and downstream systems and their status, a pre-determined number of recent changes to the response systems (such as for example the last five changes), related incidents and most importantly near real-time visibility as to who is engaged and who is working on what problem.

SUMMARY OF THE DISCLOSURE

One or more non-transitory computer-readable media storing computer-executable instructions which, when executed by a processor on a computer system, performs a method for providing a virtual on-watch. The method may include receiving a report of a service outage incident, auto-generating and/or arranging an electronic bridge to serve as an electronic staging area to respond to the service outage incident, and transmitting, using a transmitter, an Application Programming Interface (API) call to a WebEx bridge platform for all bridge information available in the computer network. The bridge information includes all of a plurality of electronic bridges that are currently being hosted by the WebEx bridge platform, and a plurality of responders that are currently involved in at least one of the electronic bridges.

The method may further include identifying, using the processor in electronic communication and a proprietary algorithm, a set of responders that are capable of responding to the incident, that are not listed among the plurality of responders that are currently involved in at least one of the plurality of electronic bridges, and that are electronically identified by the proprietary Virtual On Watch algorithm, according to the embodiments, or other suitable algorithm, as available to join electronic bridge. Finally, the method may include using the proprietary platform to send an electronic prompt to at least one of the set of responders to join the electronic bridge.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 7 shows another illustrative display screen in accordance with the principles of the disclosure.

DETAILED DESCRIPTION OF THE DISCLOSURE

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
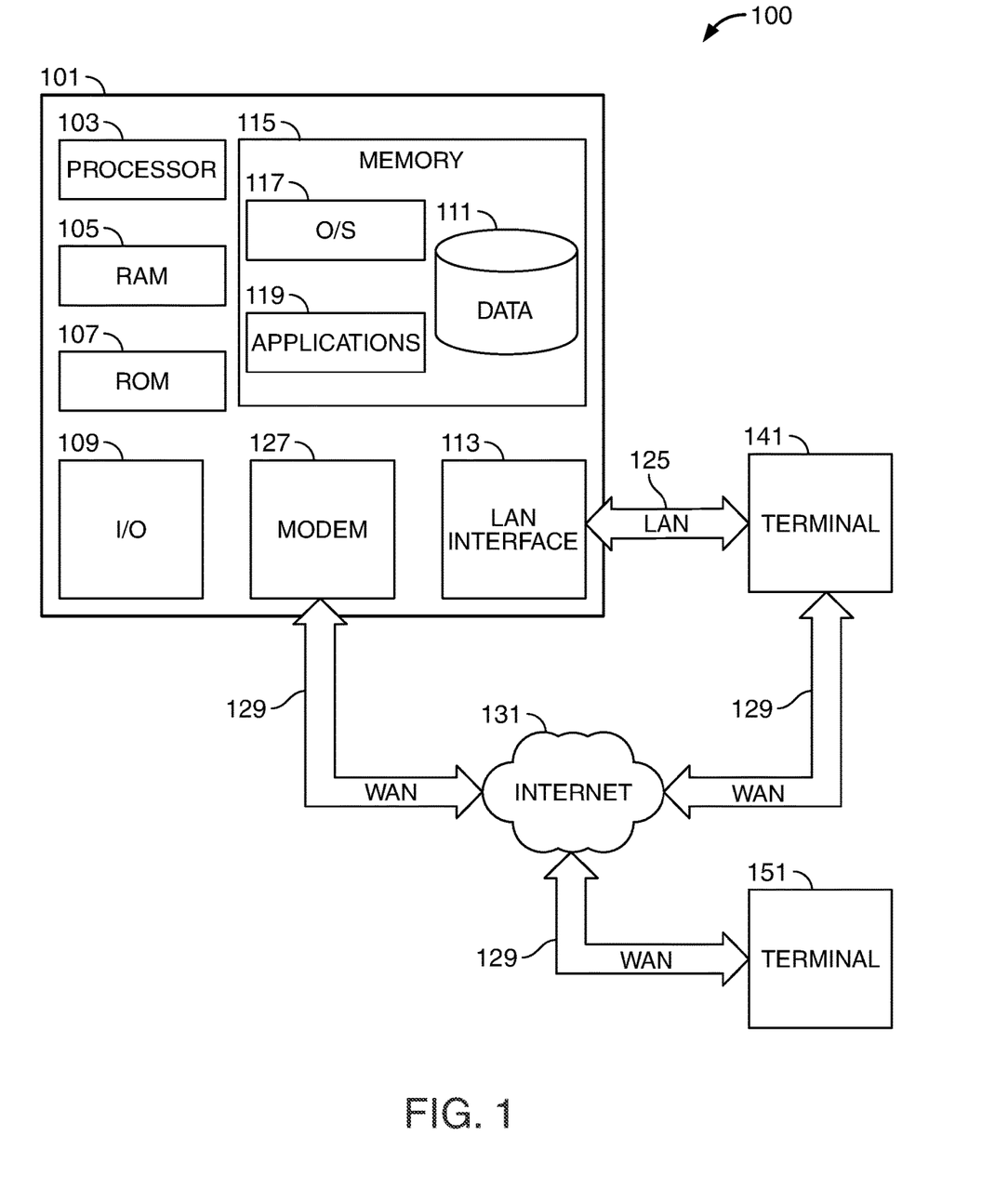
FIG. 1 shows an illustrative diagram for use in accordance with principles of the disclosure.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of communications involving Artificial Intelligence (AI) as detailed herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
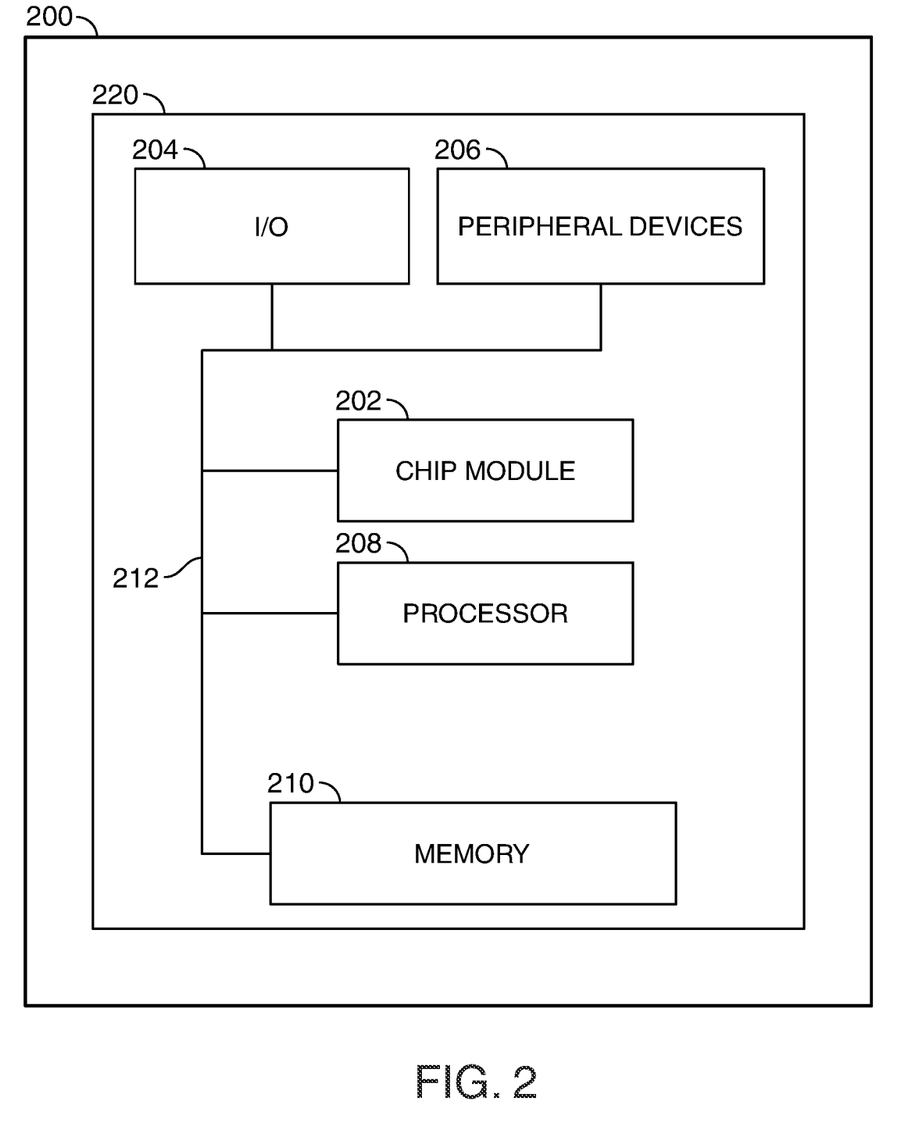
FIG. 2 shows another illustrative diagram for use in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

The embodiments set forth herein are formulated in response to a triage that requires multiple escalation levels to get the right, and available resources, to join a call. After conversations with various senior managers, it became apparent that significant interest exists in an entity to be obtain visibility into what people are doing and who is working on what issues during IT outages/incidents.

Embodiments according to the current disclosure provide centralized orchestration capabilities, end-to-end workflow automation as well as comprehensive near real-time intelligence. These features enable accurate decision making prior to and during triages across select command and control functions. Additionally, embodiments offer in-depth analysis of resource engagement over time, cost of paging/engaging resources and identification on-call coverage improvement opportunities.

The embodiments set forth herein deliver end to end workflow automation across certain command and control functions. The workflow automation is administered through API integration, technology upgrades and tooling simplification. The embodiments preferably centralize triage orchestration capabilities and provide comprehensive real-time or near real-time intelligence, enabling accurate decision making prior to and during triages to incident responses.

Additionally, the embodiments offer in-depth analysis of resource engagement over time, provide estimates for cost of paging/engaging resources and identify on-call coverage improvement opportunities.

Embodiments according to the disclosure may include at least the following five (5) aspects:

Production Architecture

Figure 3:
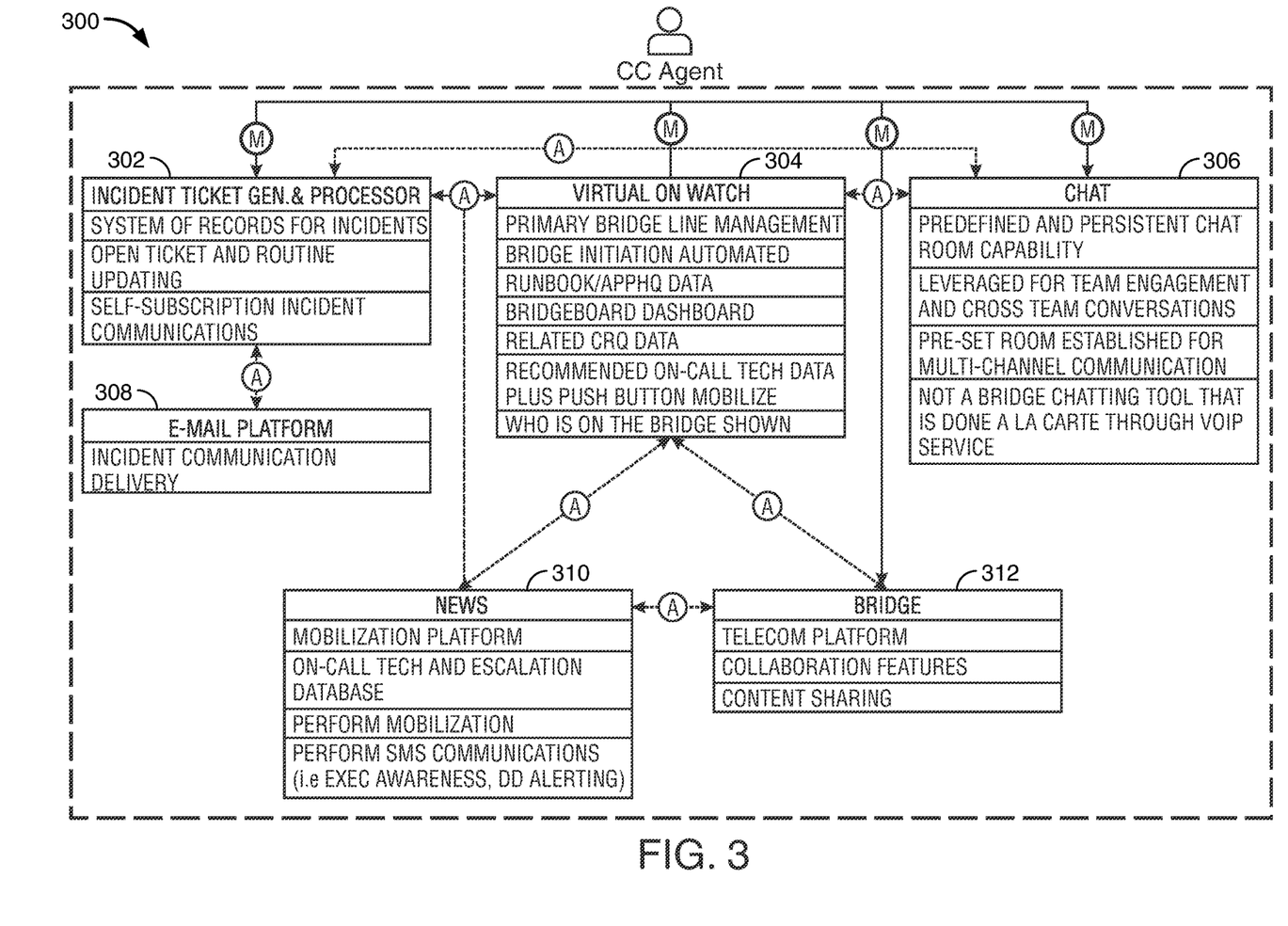
FIG. 3 shows an illustrative schematic diagram in accordance with the principles of the disclosure.

FIG. 3 shows a generalized architecture 300 of a production architecture according to embodiments according to the disclosure. At 302, an incident ticket and processing platform is provided. Such a platform may include an aspect related to a system of record for incidents. In addition, such a platform may include an open ticket and routing updating platform. Also, such a platform may be configured to provide self-subscription incident communications. For the purposes of this application, self-subscription incident communications refer to when a user/person subscribes to receive a notification about a system, component and/or service when the system, component and/or service is experiencing an outage that caused in an incident.

The incident ticket and processing platform 302 may be in communication with an e-mail platform 308, a virtual on-watch platform 304, an electronic chat platform 306 and a bridge platform 312. The letter along the lead lines—e.g., A and M—correspond to an exemplary line of associates and managers as these two roles would be expected to receive and transmit the information set forth herein.

Production architecture 300 preferably enables users to visually assess impact and status of all active incidents. Further, production architecture 300 preferably includes actionable information needed to initiate and manage command center incident triage bridges.

In addition, production architecture 300 streamlines the intake process aligned to existing workflow, which, in turn, allows quicker triage initiation. For example, virtual on-watch 304 provides a primary bridge line management console, auto-creation of a bridge line, Runbook/AppHQ data (i.e., data that provides one-stop-shop access to all data required to make decisions about the impacted application and resulting incident, BridgeBoard data (data used for creating an instance of team collaboration software (chat) for the team to use—the key here is that all this done automatically within the proprietary algorithms, thereby saving time and resources and enabling team to focus on the incident and problems related thereto), related CRQ data (CRQ data uniquely identifies all changes to an application and helps to determine if the incident is caused by a change (also in this case where everything is available from a single location), recommended Oncall Tech Data plus push-button-mobilize, and a list of who is currently on the bridge. It should be noted that each of the above-named resources that have been identified are particular only to the functions provided by the resources and not to the specific applications that are identified herein. Any suitable applications that are capable of producing similar results are considered as within the scope of the invention.

In combination with chat platform 306, virtual on-watch 304 auto-creates chat rooms for each triage bridge, pre-defines (and/or accommodates a user definition) and persists chat room capabilities, leverages chat rooms for team engagement and cross team conversations, pre-sets room established for multi-channel communications, and can be configured to programmatically retrieve on-call participant information.

Embodiments of virtual on-watch 304 may also enable auto-provisioning of WebEx® or other suitable triage bridges. In addition, bridge platform 312 may preferably provide a telecom platform, collaboration features, programmatically retrieve of on-call participant information and content-sharing to the extent that bridge platform 312 is capable of being so configured and is so configured.

News feeds, employee and other look up features, chat platform improvements, and WebEx Application Programming Interface (API) integration may also be incorporated thereby for significant further automation opportunities.

Opportunities presented by WebEx integration may include performing actions as the user such as sending a message (/docs/api/v1/messages/create-amessage) with an interactive card (/docs/api/guides/cards) to a potential responder.

To accommodate a response to events such as a response to an interactive card, the WebEx bridge preferably need to configure webhooks.

Webhooks informs a user app know when an activity has occurred so the user can act. With interactive cards, the system can give users even more ways to interact with the WebEx bridge. Such interactive cards may preferably promote a more immediate user response in order to still further reduce response time in the embodiments. It should be noted that other integrations that may be leveraged for use with virtual on-watch platform 304 according to the embodiments are set forth in detail at Appendix A, entitled Build—Integrations_Webex for Developers.pdf.

Production View

Figure 4:
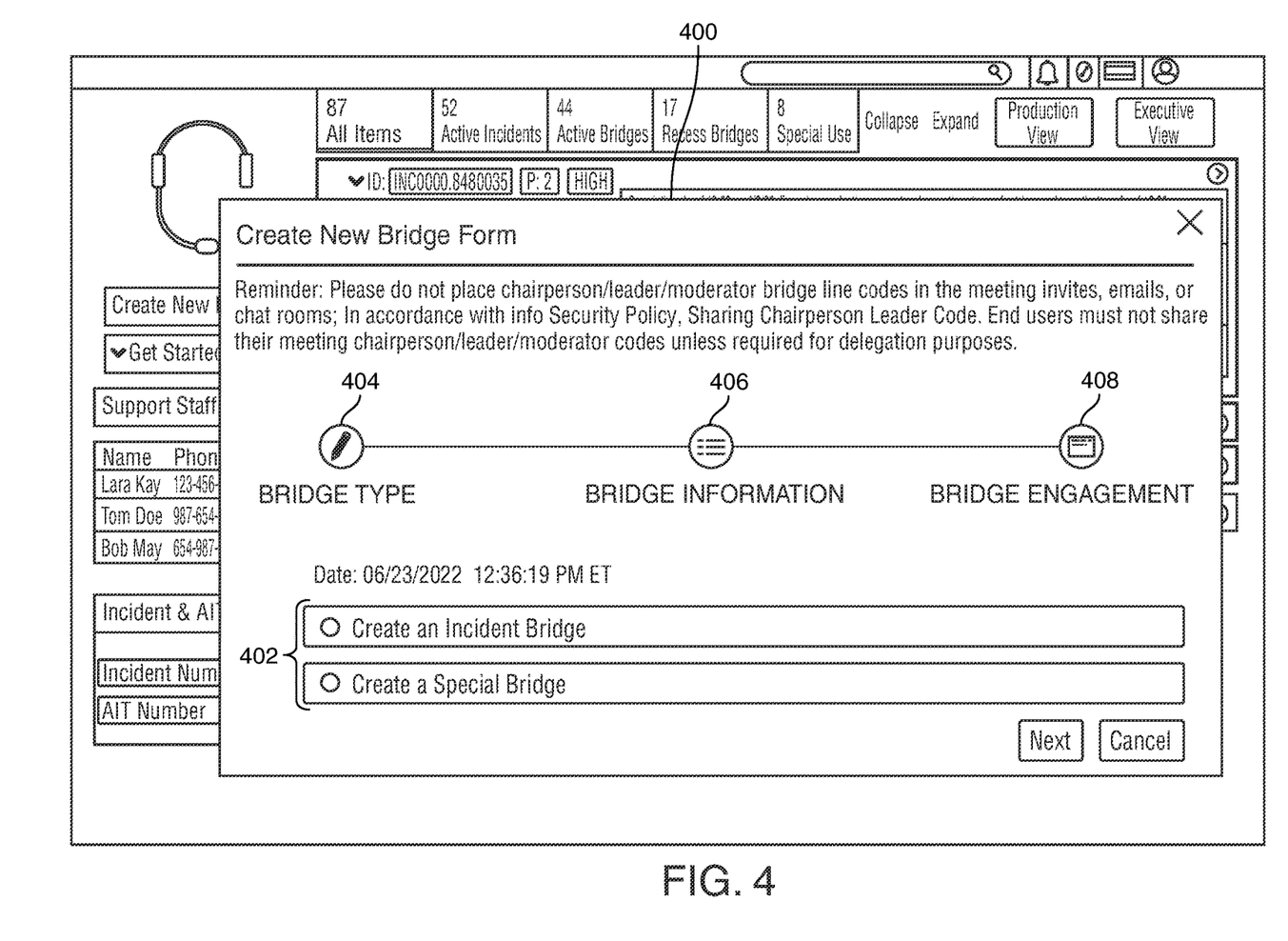
FIG. 4 shows an interactive display screen in accordance with the principles of the disclosure.

The production view (shown in both FIGS. 4 and 6) may present a comprehensive view of all ongoing triages within an entity. Such a view preferably enables one to visually assess the state of incident management and identify and join appropriate triage, where necessary. FIG. 4 shows an example of a production view with a bridge creation form 400 according to the disclosure.

Figure 6:
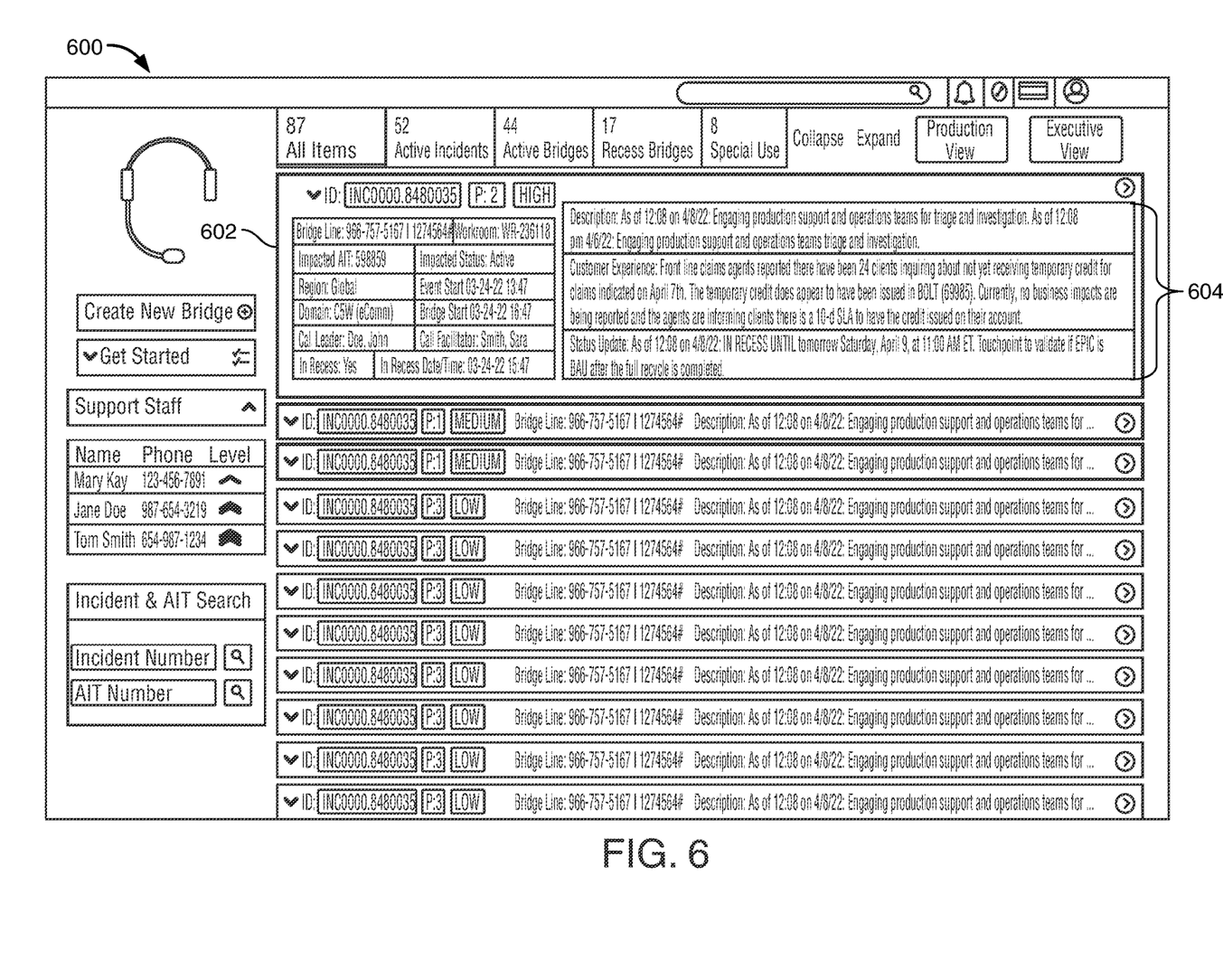
FIG. 6 shows an illustrative display screen associated with in accordance with the principles of the disclosure.

An incident number may be displayed in the production view (see FIG. 6). Details of the bridge may also be shown. In order to allow the viewer to see information about other incidents, the other incidents may be collapsed into single-line displays.

New Bridge Creation

The aspect of visual on-watch 304 that relates to bridge creation may involve using an interactive create new bridge form 400, as shown in FIG. 4. Interactive form 400 streamlines new bridge creation, reducing overhead associated with bridge creation workflow.

Such a form 400 provides the ability to create new bridges in real-time or substantially in real time before all engagement information becomes available which, in turn, reduces time needed to start triages, reducing service restoral time.

Also form 402 provides the ability to define bridge type 404, add bridge information as necessary at 406 and engage the bridge at 408. The form may preferably enable updating triage status in real-time, or substantially real time, from the same form 400. It should be noted that a user selection between an incident bridge and a special bridge is prompted at 402.

Details View

Figure 5A:
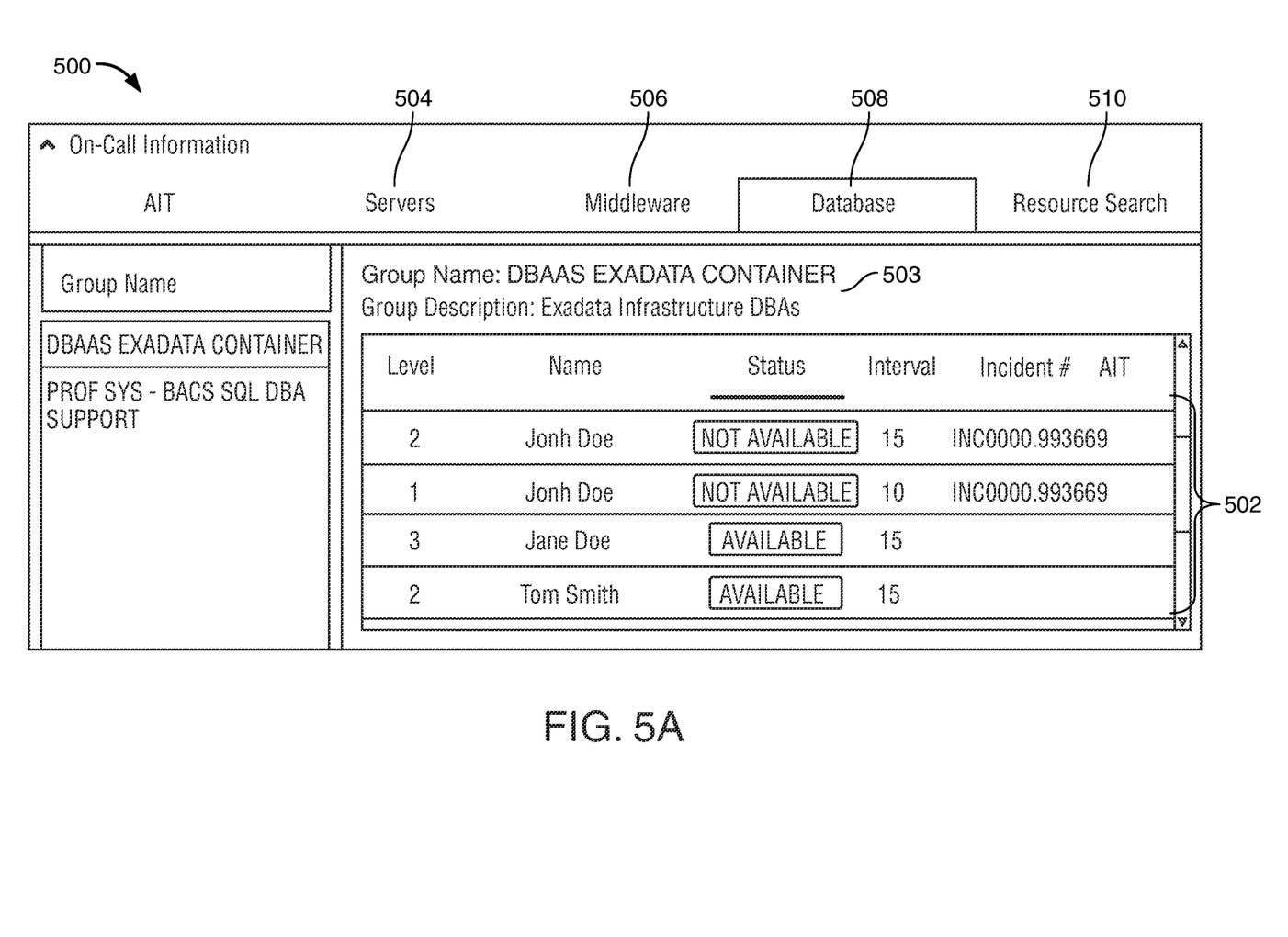
FIG. 5A shows an interactive display screen associated with on-call details.

FIG. 5A shows mapping on-call support groups with respect to support of applications (not shown), servers 504, middleware 506, and databases 508. This is all shown in detail in FIG. 5A.

Identifying real-time resource availability and what resources are currently in play—i.e., being worked on—is shown at 502. This block indicates the level of involvement, the name of the support person, the status of the support person, the interval at which the response time for the support person is set and the incident no. if any to which the support person is currently assigned. The particular category of the support person (an exadata infrastructure DBA) is indicated at 503.

The details view may be further configured to: present or otherwise list information for the impacted application to expedite decision-making during triage, present or otherwise list active or recently closed incident numbers in order to identify impacted component(s), present or otherwise list, present or otherwise list upstream and downstream dependencies, present or otherwise list last pre-determined number of changes with respect to impacted component, present or otherwise list application infrastructure components, and present or otherwise list active bridges.

Figure 5B:
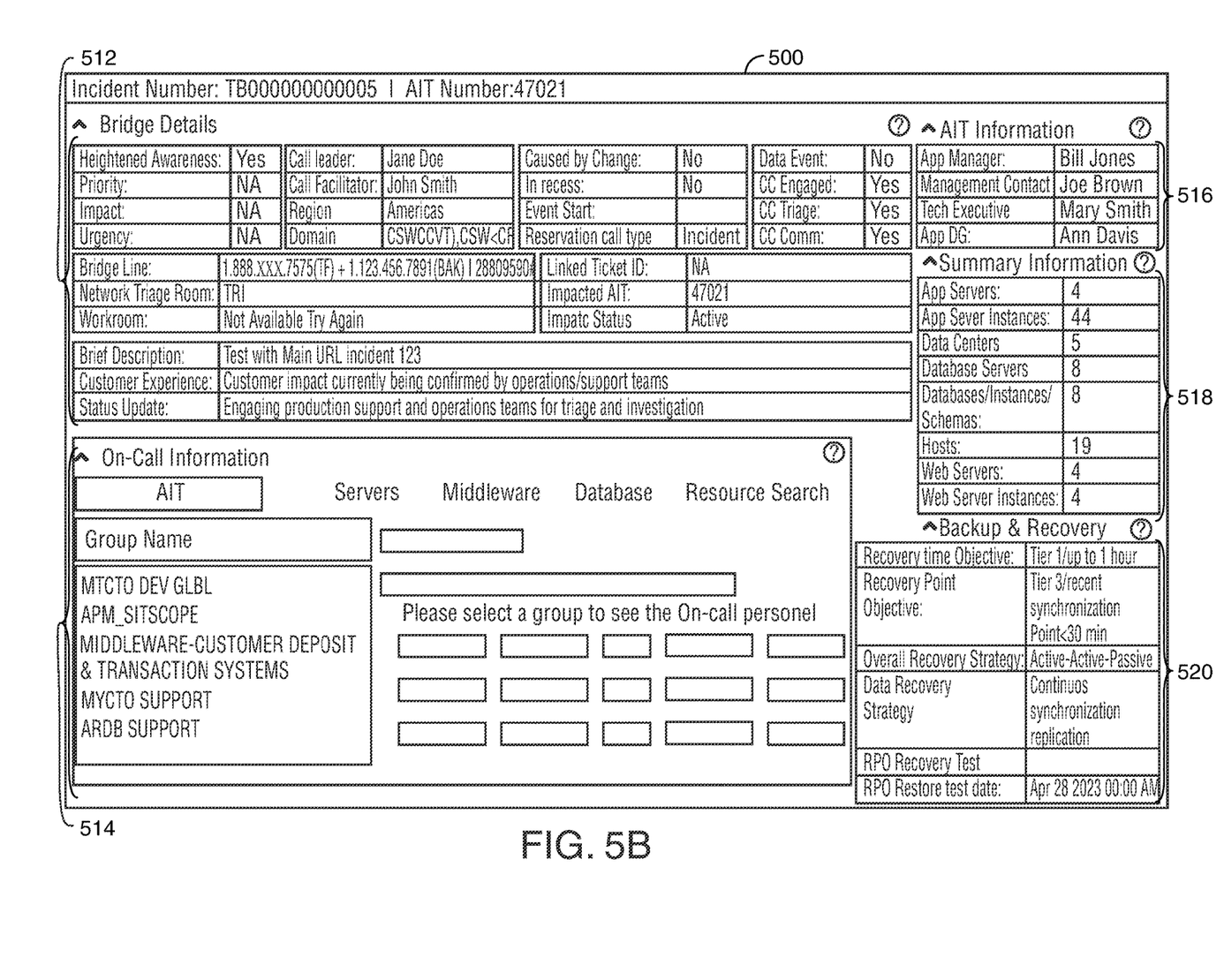
FIG. 5B shows an interactive display screen associated with electronic bridge details.

FIG. 5B shows further aspects 511 of the details view including the bridge details 512, the on-call information 514, an overview of all information 516, summary information 518 and backup & recovery information 520.

Figure 5C:
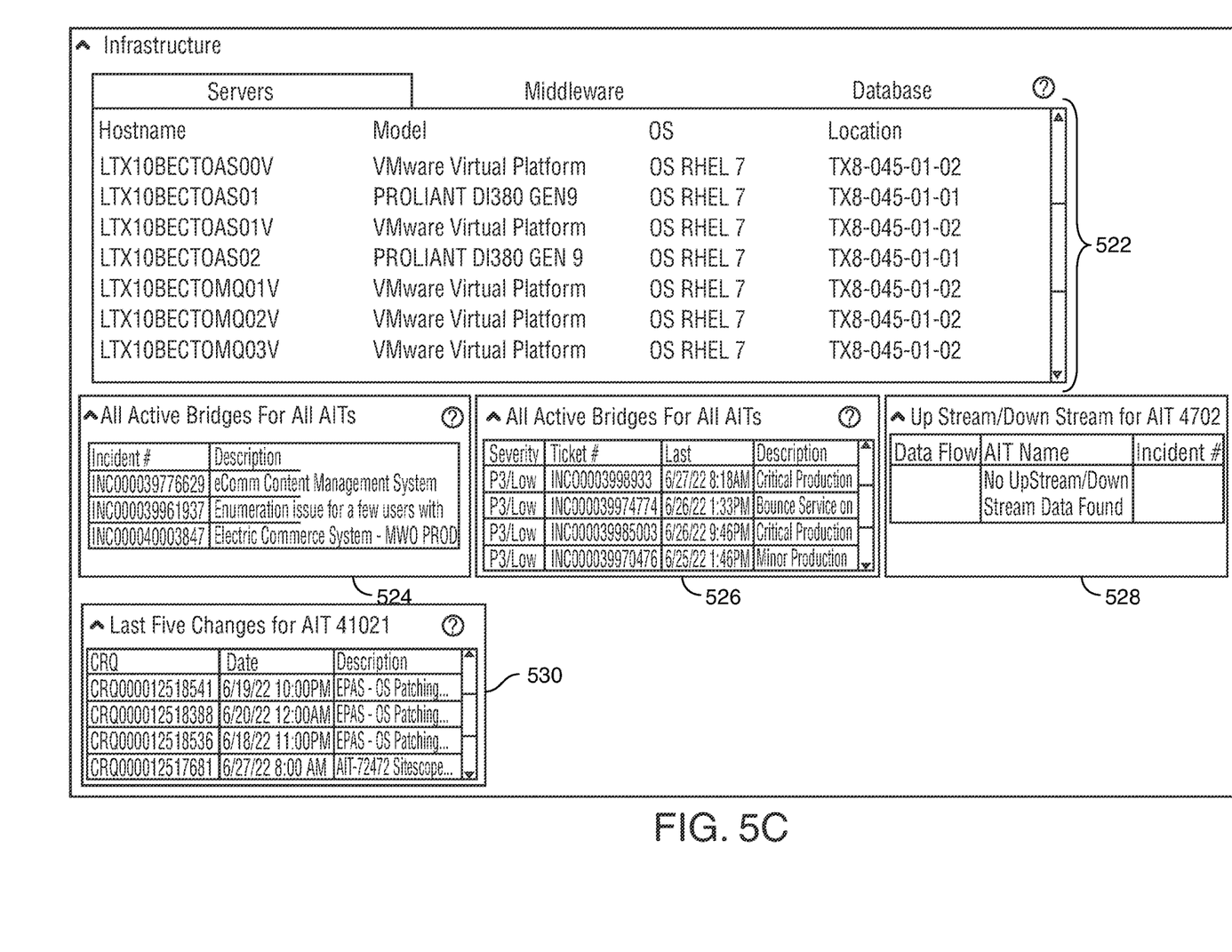
FIG. 5C shows an interactive display screen associated with infrastructure details in accordance with the principles of the current disclosure.

FIG. 5C shows yet further aspects of the details view. These aspects include server listings 522, all active bridge listings for all application inventory tools (AITs) 524 (which is used as a unique application identifier), last five incidents for AIT 526, upstream/downstream for a specific AIT 528, and the last five changes for AIT 530. It should be noted that, at least in one embodiment, the details for all active bridge listings for all AITs 524 may preferably be retrieved by leveraging an API feed from a WebEx bridge, as set forth in more detail in Appendix A.

In one embodiment, this retrieval may be performed in real time or substantially real-time using meeting:admin-_participants_read to obtain participant information from meetings for all WebEx users of an organization. Such information may enable the embodiment to determine which person has signed on to—i.e., electronically logged in to—the bridge or is currently signed on to other bridges. Other systems and methods for determining the status of participant information from meetings for all WebEx users of an organization are available and also within the scope of this invention.

FIG. 6 shows a full production view 600, absent the bridge creation overlay shown in FIG. 4. View 600 preferably provides incident information for multiple incidents. Production view 600 shows one incident in full or semi-full detail, and multiple incidents collapsed into single-line displays.

Executive View

FIG. 7 shows an executive view 700. Executive view 700 preferably provides incident information for multiple incidents. Unlike production view 600 shown above in FIG. 6, which shows multiple incidents collapsed into single-line displays, executive view 700 can show multiple incidents as summary views such that an executive can summarily review many views in a single screen, and glean details of same.

Figure 8:
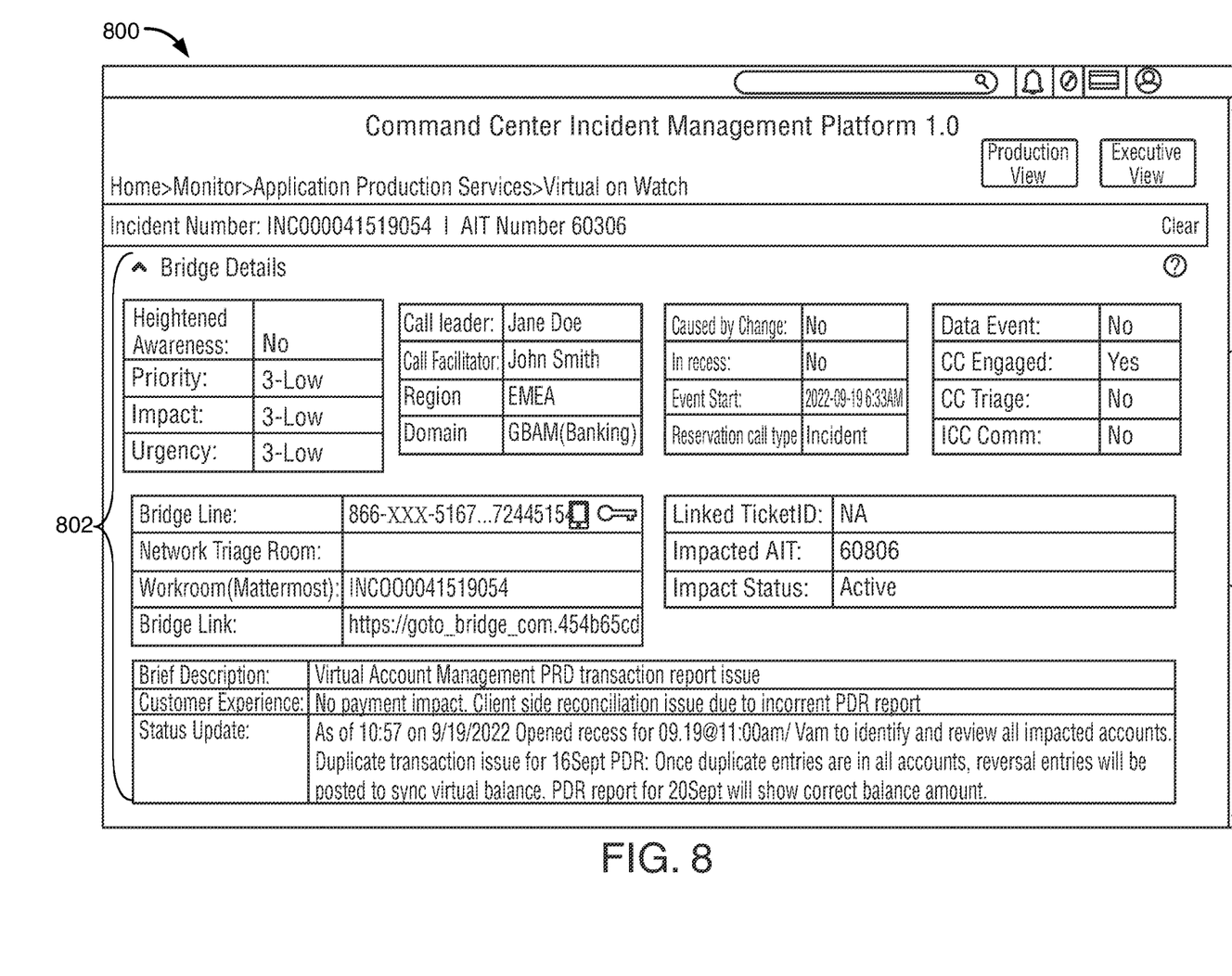
FIG. 8 shows yet another illustrative display screen in accordance with the principles of the disclosure.

FIG. 8 shows an enlarged view 800 of bridge details 802.

Further aspects of the invention may include reporting. Such aspects may provide an in-depth analysis of resource engagement over time, a resource-cost of paging/engaging resources and may identify on-call coverage improvement opportunities.

In addition, aspects of the disclosure may relate to applications impacted. As such, the embodiments may describe impacted software across an entity, including some or all of the systems from the list below:

Core Software
Channel platform software
Corporate software
Loan origination and servicing systems
Cards and payments systems
Enterprise software
Data management and analytics systems The current production format of the embodiments has been put into use and has transformed the way the entity manages triages. It centralizes triage orchestration capabilities and provides comprehensive real-time, or near real-time, intelligence, enabling accurate decision making prior to and during triages across command and control functions.

For the command center, embodiments deliver end-to-end workflow automation, significantly simplifying incident bridge creation and maintenance. Centralized triage orchestration capabilities enable instantiation of chat, bridge initiation—e.g., with WebEx, and opening incident tickets all within one screen. This joining of various tasks in a single location saving precious time during initial triage phases. It also provides real-time bridge information and status updates in a single place.

One aspect of the embodiments is their ability to determine correct support groups to be engaged for faster service restoral. In addition, the embodiments, following determination of correct support groups, subsequently identify available resources on call that are not engaged on any other problem remediation at that time. This is achieved by integrating with other entity systems such as an on-call scheduling system and WebEx, where embodiments pull real-time attendance information for subsequent analysis and correlation.

Specifically, by leveraging the API-callable items set forth in Appendix A, the embodiments may obtain a real-time picture of resource availability. Furthermore, the leveraging the API-callable items can also help determine upstream problems and downstream problems. As such, a user can leverage the WebEx API to determine whether there are other existing bridges relating to the problems that are currently ongoing—thereby obviating the need for the creation of new or other bridges.

Aggregation, analysis and reporting of on-call engagement data also prompt another significant improvement described by the embodiments because these operations provide intelligence into on-call rotations and associated challenges. Some of the key questions that embodiments help to answer are: Are teams staffed appropriately? Are rotations optimized? Are there imbalances within teams in who responds to calls and often requested to join calls? Are some team members overstressed? Effectiveness of talent distribution and team member. The embodiments offer in-depth analysis of resource engagement over time, cost of paging/engaging resources and identify on-call coverage improvement opportunities.

There were several technical challenges during the development of the embodiments. These technical challenges include understanding and documenting systems and processes used within an entity to maintain and identify rotations, support groups and on-call support availability to determine if automated solutions were even possible. Numerous support, engineering and command center operations have also been provided direction to determine whether automated solutions were even possible. Process gaps were discovered that caused paging of wrong groups/resources and brought it to the command center's attention for remediation.

Implementation and adoption of the embodiments by the command center came with significant process changes that team helped to influence. One example of such changes is that the systems were adapted to ensure that the system could programmatically retrieve on call participant information from the bridges that were used by the command center. As a result, the command centers employ bridges provided by WebEx®.

The following technology has been leveraged for use in the embodiments.

Cloud/hybrid cloud
WebEx (or similar) API as set forth in Appendix A
Messaging/middleware
AI/ML (Natural Language Processing (NLP), machine vision, decisioning)
Data management technology (e.g., data lakes, data fabric, next gen EDM)
Microservices/containerization
Biometrics (voice, facial, fingerprint)

It should be noted that the embodiments provide a value chain impact with respect to:

Product development/innovation; and
Operational efficiency.

The embodiments set forth herein have been implemented to:

Decrease restoral of service time;
Decrease redundancies and workload on command center teams;
Enable much more accurate decision making;
Target paging of available resources improves effectiveness of triages; and
Provide historical reporting and ability to compare performance over time.

Following implementation of the embodiments disclosed herein, the embodiments have decreased triage initiation time and increased efficiency by centralizing preferably all related information in one location.

The embodiments determine correct support groups to be engaged for faster service restoral and subsequently identify available resources on call that are not engaged on any other problem remediation, provide shortened restoral of service time and reduced stress on engineering and middleware teams. Finally, its data analysis and reporting capabilities provide valuable insights that enable management to improve efficiencies and their team's effectiveness.

Thus, systems and methods for providing VIRTUAL ON-WATCH. Persons skilled in the art will appreciate that the present invention can be practiced by other than the described embodiments, which are presented for purposes of illustration rather than of limitation. The present invention is limited only by the claims that follow.

What is claimed is:

1. One or more non-transitory computer-readable media storing computer-executable instructions which, when executed by a processor on a computer system, perform a method for providing a virtual on-watch, the method comprising:

receiving, using a receiver, a report of a service outage incident in a computer network;

arranging an electronic bridge to serve as an electronic staging area to respond to the service outage incident, wherein said electronic bridge is configured to determine whether a previous-in-time electronic bridge that relates to the subject matter of the service outage incident already exists, and when said previous-in-time electronic bridge exists, ceasing arranging of the electronic bridge and prompting at least one of a set of responders to join the previous-in-time electronic bridge;

transmitting, using a transmitter, an Application Programming Interface (API) call to a WebEx bridge platform for all bridge information available in the computer network, said bridge information that comprises all of a plurality of electronic bridges that are currently being hosted by the WebEx bridge platform, and a plurality of responders that are currently involved in at least one of the plurality of electronic bridges;

identifying, using the processor in electronic communication with the WebEx bridge platform, a set of responders that are capable of responding to the incident, that are not listed among the plurality of responders that are currently involved in at least one of the plurality of electronic bridges, and that are electronically listed on the WebEx bridge as available to join the electronic bridge; and using the WebEx bridge platform to send an electronic prompt to the at least one of the set of responders to join the electronic bridge.

2. The method of claim 1, further comprising arranging an electronic chat room to respond to the service outage incident.

3. The method of claim 1, further comprising displaying a plurality of electronic bridges currently active across an entity.

4. The method of claim 1, further comprising displaying a plurality of changes made to a component impacted by the incident.

5. The method of claim 1, further comprising displaying a plurality of active or recently closed incidents relating to a component impacted by the incident.

6. The method of claim 1, further comprising a list of application infrastructure components impacted by the incident.

7. A system for providing a virtual on-watch, the system comprising one or more non-transitory computer-readable media storing computer-executable instructions which, when executed by a processor on a computer system, perform a method for providing a virtual on-watch, the system comprising:

a receiver for receiving a report of a service outage incident in a computer network;

an auto-generated electronic bridge said electronic bridge configured to, following receiving the report of the incident, serve as an electronic staging area to respond to the service outage incident;

the processor configured to determine whether a previous-in-time electronic bridge, said previous-in-time electronic bridge that relates to the subject matter of the service outage incident of the auto-generated electronic bridge already exists and when said previous-in-time electronic bridge exists, the processor is further configured to cease arranging of the auto-generated electronic bridge;

a transmitter for transmitting an Application Programming Interface (API) call to a WebEx bridge platform for all bridge information available in the computer network, said bridge information that includes all of a plurality of electronic bridges that are currently being hosted by the WebEx bridge platform, and a plurality of responders that are currently involved in at least one of the plurality of electronic bridges;

the processor further configured, in combination with the WebEx bridge platform, to identify a set of responders that are electronically identified as qualified responding to the incident, that are not listed among the plurality of responders that are currently involved in at least one of the plurality of electronic bridges, and that are electronically listed on the WebEx bridge as available to join the electronic bridge; and wherein the WebEx bridge platform is configured to send an electronic prompt to the at least one of the set of responders to join the electronic bridge.

8. The system of claim 7, further comprising an electronic chat room configured to respond to the service outage incident.

9. The system of claim 7, further comprising a display that displays a plurality of electronic bridges currently active across an entity.

10. The system of claim 7, further comprising a display that displays a plurality of changes made to a component impacted by the incident.

11. The system of claim 7, further comprising a display that displays a plurality of active or recently closed incidents relating to a component impacted by the incident.

12. The system of claim 7, a display that displays a list of application infrastructure components impacted by the incident.

* * * * *